Dec. 30, 1969  H. ROOCK ET AL  3,486,397

PULL HANDLE FOR BOWDEN WIRE

Filed March 4, 1968

HEINZ REST
HANS ROOCK
INVENTOR

BY John R. Faulkner
John J. Roethel
ATTORNEYS

United States Patent Office 3,486,397
Patented Dec. 30, 1969

3,486,397
PULL HANDLE FOR BOWDEN WIRE
Hans Roock, Trajanstr. 21, Cologne, Germany, and
Heinz Rest, Martin Luther Str., Esch, Germany
Filed Mar. 4, 1968, Ser. No. 710,299
Int. Cl. F16c *1/10;* G05g *1/06*
U.S. Cl. 74—501                              4 Claims

ABSTRACT OF THE DISCLOSURE

A pull handle that consists of two parts, a support part pivotally mounted in a bracket beneath a vehicle instrument panel and a hand grip part pivotally connected to the support part. The support part and hand grip part are provided with abutments coacting in a way so that at a pull on the hand grip part the pull handle swings as a unit; whereas at a push on the hand grip part the latter swings against the resistance of a resilient means independently of the support part to a retracted position beneath the instrument panel.

BACKGROUND OF THE INVENTION

The present invention relates to a pull handle for a Bowden wire for releasing a latch mechanism of a closure arranged at a distance from the handle, such as an engine compartment hood or a luggage compartment deck lid. Known pull handles for this purpose are formed as a single arm lever which is pivotable about a fixed axis and whereby the Bowden wire is fastened to the lever near the axis.

The object of the present invention is to provide a pull handle of the above-mentioned type which in particular meets with the requirements of use in motor vehicle construction. These are good accessibility, low operating efforts and particularly avoidance of the danger of bodily injury in the event of an accident.

SUMMARY OF THE INVENTION

The contrary requirements as to good accessibility and, therefore, the arrangement of the pull handle at the lower edge of the instrument panel within the radius of action of the driver and as to low danger of bodily injury and, therefore, the arrangement of the pull handle out of the possible impact area of a part of a person's body are met according to the present invention is a simple manner.

The pull handle is formed as a single lever consisting of two parts, a support part which is pivotally arranged on an axis fixed in a bracket on the instrument panel and a hand grip part which is pivotally connected to the support part. Both parts are provided with abutments coacting in a way so that at a pull on the hand grip part the pull handle swings as a unit whereas at a push on the hand grip part the latter swings against the resistance of a resilient means independently of the support part to a retracted position beneath the instrument panel.

The end of the Bowden wire to be operated by the pull handle is fastened at the pivot means connecting the support part and the hand grip part.

A substantially V-shaped spring encompasses the pivot means connecting the support part and the hand grip part and acts on the two parts so that they are kept in predetermined relationship to each other.

BRIEF DESCRIPTION OF THE DRAWINGS

Other objects, advantages and features of the present invention will become more apparent as this description proceeds, reference being made to the accompanying drawings, wherein.

DESCRIPTION OF THE INVENTION

Figure 1:
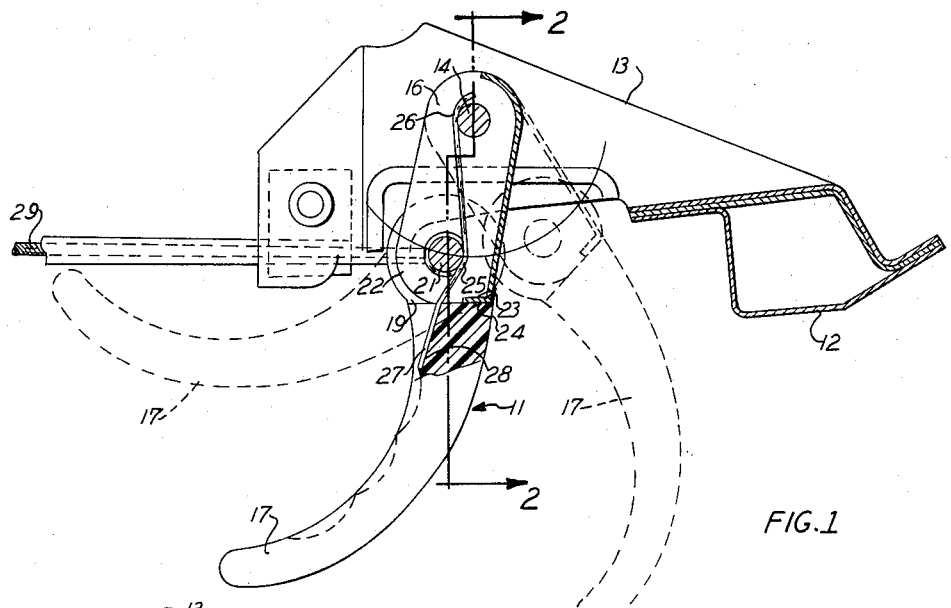
FIG. 1 is a side elevation in part sectional of an embodiment of a pull handle in accordance with the present invention, the handle being shown in its place at the instrument panel of a motor vehicle with the normal inoperative position shown in solid outline and the two positions of displacement in dash-dot outline.
Figure 2:
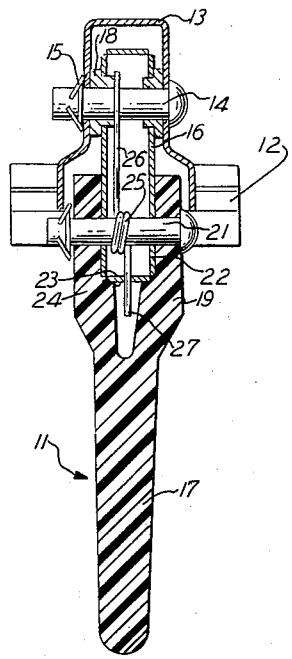
FIG. 2 is a section along the line 2—2 of FIG. 1.

Referring now to the drawing, and more particularly to FIGS. 1 and 2, the first embodiment of the pull handle, generally designated 11, is shown in its place relative to the underside of an instrument panel 12 of a vehicle body. At the lower edge of the instrument panel 12 there is mounted a receptacle or bracket 13 which receives the pivot stud 14 forming the fixed pivot axis about which the pull handle 11 is swingable. The pivot stud 14 is retained on the bracket 13 by a snap fastener 15 or the like.

The pull handle 11 consists of two parts, a stamped sheet metal support part 16 and a plastic hand grip part 17. The sheet metal support part is journalled on the pivot stud 14 and positioned with respect to the side walls of the bracket 13 by spacer rings 18. The plastic hand grip part 17 in turn is journalled at its upper end 19 by a pivot stud 21 to the lower end 22 of the support part 16.

The support part 16 and the hand grip part 17 are provided with abutment 23 and 24, respectively, located at one side of the pivot axis 21, the right of the axis as viewed in FIG. 1. The abutments 23 and 24 are so located so as to coact to cause a pulling motion on the hand grip part 17 to be transmitted to the support part 16 and both to swing as a single lever about the pivot axis defined by the pivot stud 14, as best seen in FIG. 1.

The pull handle 11 is maintained normally in single lever form by a coil spring 25 encompassing the pivot stud 21, the spring having a first end extension 26 resting against the pivot stud 14 and a second end extension 27 resting against a surface 28 of the hand grip part 17. The spring is preloaded to hold the parts in abutting relation. In the event of bodily contact with the hand grip part 17, such as might be caused by a person's knee coming into contact due to the momentum of a sudden stop causing the person to be thrown forward, the pull handle will break against the resistance of the spring 25. The hand grip part 17 will swing forwardly about the pivot stud 21 to a substantially horizontal position under the instrument panel as shown in dash-dot outline in FIG. 1. As soon as the pressure on the hand grip portion is released, the spring 25 will restore the parts to their normal relationship.

The Bowden cable 28 to be operated by the pull handle 11 is shown coupled to the pivot stud 21 so that it is responsive to movement of the handle only in a counterclockwise direction about the pivot stud 14 as viewed in FIG. 1. The Bowden cable is adapted to actuate a latch mechanism (not shown) for the closure of a vehicle body compartment, such as the hood of an engine compartment or the deck lid of a luggage compartment.

Figure 3:
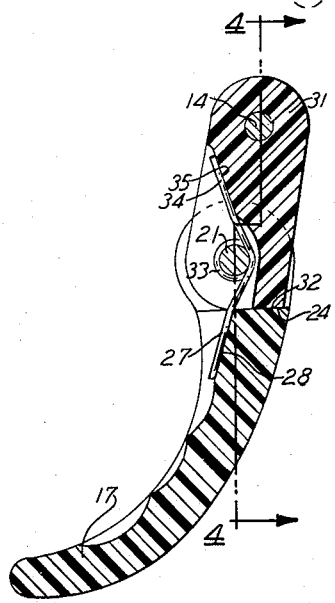
FIG. 3 is a view in part similar to FIG. 1 illustrating a second embodiment of the invention.
Figure 4:
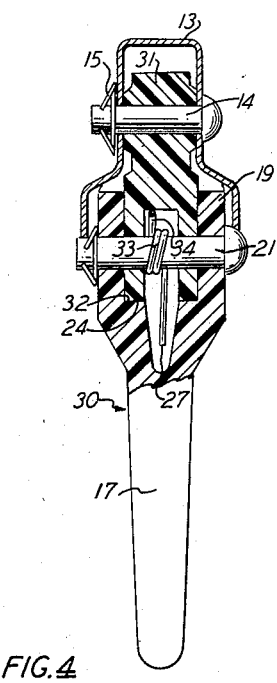
FIG. 4 is a section along the line 4—4 of FIG. 3.

The embodiment of the pull handle shown in FIGS. 3 and 4 and generally designated 29 is functionally similar to the pull handle 11. It differs therefrom primarily in that the support part 31 is a molded plastic part. It has an abutment 32 corresponding to the abutment 23 on the support part 16 of the pull handle 11. The hand grip part 17 is as previously described and has an abutment 24 engageable with the abutment 32. The two handle parts are maintained in normal aligned relationship to each other by a spring 33, corresponding to spring 25, except that the upper extension 34 of this spring bears against a surface 35 of the support part 31 rather than against the pivot stud 14.

We claim:
1. A pull handle coupled by a Bowden wire to a latch mechanism for a closure in an opening in a vehicle body, the pull handle being formed as a single arm lever pivoted about a fixed axis in a bracket beneath an instrument panel of the vehicle body, wherein the improvement is characterized in that:

- the single arm lever consists of a support part and a hand grip part,
- said support part being pivotal about the fixed axis in the bracket,
- a pivot means pivotally connects the hand grip part to the support part for swinging movement about a pivot axis spaced from said fixed axis,
- said support part and said hand grip part being provided with abutment portions at one side of the pivot axis formed by said pivot means,
- said abutment portions coacting upon said grip part being pulled in latch mechanism releasing direction to cause said support part to swing as a unit,
- said hand grip portion upon being pushed in a direction to separate the abutment portions swinging independently of said support part into an angular relationship thereto beneath the instrumental panel,
- and the Bowden wire is fastened to the single arm lever at the pivot means connecting the hand grip part to the support part.

2. A pull handle according to claim 1, in which:
a coil spring encompasses the pivot means connecting the hand grip part to the support part,
said spring having end portions each of which contacts a hand grip part and support part, respectively,
said spring resiliently urging the hand abutment portion into engagement with the support part abutment portion and therefor the hand grip portion into position to be gripped.

3. A pull handle coupled by a Bowden wire to a latch mechanism for a closure in an opening in a vehicle body, the pull handle being formed as a single arm lever pivotal about a fixed axis in a bracket beneath an instrument panel of the vehicle body, and the Bowden wire being fastened to the single arm lever near its fixed pivot axis, wherein the improvement is characterized in that:

the pull handle being formed as a single arm lever and a hand grip part,
- said support part being pivotal about the fixed axis in the bracket,
- a pivot means pivotally connects the hand grip part to the support part for swinging movement about a pivot axis spaced from said fixed axis,
- said support part and said hand grip part being provided with abutment portions at one side of the pivot axis formed by said pivot means,
- said abutment portions coacting upon said grip part being pulled in latch mechanism releasing direction to cause said support part to swing as a unit,
- said hand grip portion upon being pushed in a direction to separate the abutment portions swinging independently of said support part into an angular relationship thereto beneath the instrument panel,
- and a coil spring encompasses the pivot means connecting the hand grip part to the support part,
- said spring having end portions each of which contacts a hand grip part and support part, respectively,
- said spring resiliently urging the hand abutment portion into engagement with the support part abutment portion and therefor the hand grip portion into position to be gripped.

4. A pull handle according to claim 3, in which:
the hand grip part curves beneath the instrument panel toward the forward end of the vehicle.

References Cited

UNITED STATES PATENTS

| | | | |
|---|---|---|---|
| 2,281,143 | 4/1942 | Dickerson | 74—524 |
| 2,294,667 | 9/1942 | Jandus | 74—524 XR |
| 3,412,626 | 11/1968 | Zeigler et al. | 74—547 XR |

FRED C. MATTERN, Primary Examiner

F. D. SHOEMAKER, Assistant Examiner

U.S. Cl. X.R.

74—524